No. 789,440. Patented May 9, 1905.

UNITED STATES PATENT OFFICE.

FLORENTINE J. MACHALSKE, OF BROOKLYN, NEW YORK, ASSIGNOR TO FREDERICK DARLINGTON, OF GREAT BARRINGTON, MASSACHUSETTS.

PROCESS OF TREATING PHOSPHATE-ROCK AND PRODUCING PHOSPHOROUS CHLORIDS AND ALKALI-METAL CYANIDS.

SPECIFICATION forming part of Letters Patent No. 789,440, dated May 9, 1905.

Application filed February 25, 1905. Serial No. 247,344.

*To all whom it may concern:*

Be it known that I, FLORENTINE J. MACHALSKE, a citizen of the United States, residing in the borough of Brooklyn, in the county of Kings and State of New York, have invented certain new and useful Improvements in Processes of Treating Phosphate-Rock and Producing Phosphorous Chlorids and Alkali-Metal Cyanids, of which the following is a specification.

According to this process rock containing tricalcium phosphate, especially low-grade rock having a phosphate contents of below seventy and down to fifty per cent., is crushed and mixed with an alkali-metal chlorid and carbon. The mixture is smelted at a temperature sufficient to decompose the rock and effect the production of phosphoric chlorid. Nitrogen or air or other gas containing nitrogen is blown through or brought in contact with the charge in the smelting-furnace and the calcium and sodium combined with carbon and nitrogen to produce cyanamids. The preferred charge consists of a water-free mixture of crushed rock and sodium chlorid and an excess of carbon in the form of broken coke, and the smelting is preferably effected in an electric furnace. The production of the cyanamids is presumably effected in two stages, the first reaction being the production of the carbids, which thereupon combine with nitrogen. The successive reactions may be represented by the following equations:

(1.) $Ca_3(PO_4)_2 + 10NaCl + 24C =$
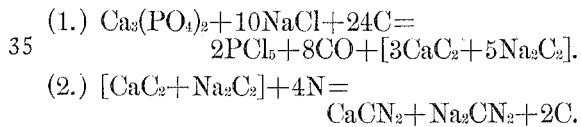

(2.) $[CaC_2 + Na_2C_2] + 4N =$
$CaCN_2 + Na_2CN_2 + 2C.$

The heating may be effected in an electric furnace either of the arc or resistance type. An electric current, preferably alternating, of from two thousand amperes at fifty volts to two thousand five hundred amperes at forty volts is sufficient for a furnace of the usual size. The resulting phosphoric chlorid is led off from the furnace and may be treated with water for the production of phosphoric and hydrochloric acids. The calcium sodium cyanamids are mixed with sodium carbonate and carbon and smelted, preferably in an electric furnace, for the production of sodium cyanid, the reaction being represented by the following equation:

(3.) $[CaCN_2 + Na_2CN_2] + Na_2CO_3 + 3C =$
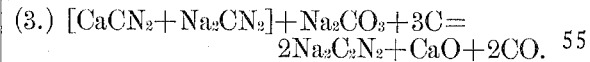

The mixture may be smelted in an electric furnace either of the arc or resistance type, an electric current, preferably alternating, of from eight hundred to one thousand amperes at fifty volts being suitable.

The sodium carbonate employed in the mixture is preferably produced by treating another portion of calcium-sodium cyanamid with water, as described and claimed in my application Serial No. 247,343 of even date herewith, the reaction being represented by the following equation:

(4.) $[CaCN_2 + Na_2CN_2] + 6H_2O =$

I claim—

1. The process of treating rock containing calcium phosphate and producing a chlorid of phosphorus and a cyanid of an alkali metal, which consists in mixing the rock with an alkali-metal chlorid and carbon, smelting the mixture at a high temperature in the presence of nitrogen, and smelting the resulting cyanamids with an alkali-metal carbonate, as set forth.

2. The process of treating rock containing calcium phosphate and producing phosphoric chlorid and sodium cyanid, which consists in mixing the rock with sodium chlorid and an excess of carbon, smelting the mixture at a high temperature in the presence of nitrogen, and smelting the resulting cyanamids with sodium carbonate, as set forth.

3. The process of treating rock containing calcium phosphate and producing a chlorid of phosphorus and a cyanid of an alkali metal, which consists in mixing the rock with an alkali-metal chlorid and carbon, electrically smelting the mixture at a high temperature in the presence of nitrogen, and electrically smelting the resulting cyanamids with an alkali-metal carbonate, as set forth.

4. The process of treating rock containing calcium phosphate and producing phosphoric chlorid and sodium cyanid, which consists in mixing the rock with sodium chlorid and an excess of carbon, electrically smelting the mixture at a high temperature in the presence of nitrogen, and electrically smelting the resulting cyanamids with sodium carbonate, as set forth.

5. The process of treating rock containing calcium phosphate and producing a chlorid of phosphorus and a cyanid of an alkali metal, which consists in mixing the rock with an alkali-metal chlorid and carbon, electrically smelting the mixture at a high temperature in the presence of nitrogen, treating one portion of the resulting cyanamids with water for the production of carbonates of calcium and the alkali metal, mixing the alkali-metal carbonate with another portion of the cyanamids, and smelting the mixture, as set forth.

6. The process of treating rock containing calcium phosphate and producing phosphoric chlorid and sodium cyanid, which consists in mixing the rock with sodium chlorid and an excess of carbon, electrically smelting the mixture at a high temperature in the presence of nitrogen, treating one portion of the cyanamids with water for the production of sodium carbonate, mixing said sodium carbonate with another portion of the cyanamids, and smelting the mixture, as set forth.

In testimony whereof I affix my signature in presence of two witnesses.

FLORENTINE J. MACHALSKE.

Witnesses:
   Jno. B. Campbell,
   Wm. P. Mitchell.